United States Patent [19]

Edwards

[11] Patent Number: 5,035,425
[45] Date of Patent: Jul. 30, 1991

[54] MULTIPLE PURPOSE PLAY BALL

[76] Inventor: Phillip L. Edwards, 33 Radnor Cir., Grosse Pointe Farms, Mich. 48236

[21] Appl. No.: 620,742

[22] Filed: Dec. 3, 1990

[51] Int. Cl.$^5$ .................. B29C 27/08; A01K 29/00
[52] U.S. Cl. ..................... 273/60 B; 273/DIG. 8;
273/DIG. 20; 273/58 J; 119/29.5
[58] Field of Search ............. 273/60 R, 60 A, 60 B,
273/58 A, 58 B, 58 BA, 58 J, 219, DIG. 8,
DIG. 20; 119/29.5

[56] References Cited

U.S. PATENT DOCUMENTS

| | | | |
|---|---|---|---|
| 1,534,964 | 4/1925 | Kahnweiler | 119/29.5 |
| 2,866,774 | 12/1958 | Price | 273/DIG. 8 |
| 3,248,113 | 4/1966 | Baggenstoss et al. | 273/DIG. 8 |
| 4,123,061 | 10/1978 | Dusbiber | 273/DIG. 8 |
| 4,326,716 | 4/1982 | La Coste | 273/DIG. 8 |
| 4,568,083 | 2/1986 | Miller | 273/60 B |
| 4,660,830 | 4/1987 | Tomar | 273/60 B |

*Primary Examiner*—George J. Marlo
*Attorney, Agent, or Firm*—Gifford, Groh, Sprinkle, Patmore and Anderson

[57] ABSTRACT

A novelty ball is disclosed which is formed from a spherical shell of high density elastomeric polyurethane polymer. The polyurethane shell has a wall thickness sufficient to return the shell to its original shape following deformation. In one embodiment, the interior of the shell is hollow whereas in a second embodiment, the hollow interior is filled with a low density polyurethane foam. A flavoring can also be added to the polyurethane which is appealing to animals, such as dogs. The shell has a hardness ranging between approximately 35 and 60 Shore D as measured by the ASTM (American Society of Testing Materials) that 2240; an ultimate tensil strength between approximately 20 and 25 MPa (mega pascals) measured by ASTM test D412; an ultimate elongation ranging between approximately 500 and 600%; a tensil strength between approximately 6.9 and 16.5 MPa at 100% elongation; and between approximately 10.3 and 19 MPa at 300% at 50% elongation; a tear strength of between approximately 80 and 140 kN/m (kilo Newtons per meter) measured by ASTM Test D 624-DieC; and a compression set of between approximately 30% and 40% at 70° C. over a 22 hour period.

5 Claims, 1 Drawing Sheet

MULTIPLE PURPOSE PLAY BALL

BACKGROUND OF THE INVENTION

I. Field of the Invention

The present invention relates to a novelty ball.

II. Description of the Prior Art

There are many types of balls that are used both for animal playthings as well as in sports. All these previously known balls suffer from one disadvantage or another.

For example, rawhide covered baseballs typically are used in the game of baseball. These baseballs, however, are relatively expensive to manufacture and become damaged relatively quickly. Furthermore, these baseballs are unsuitable for young children who may be hurt if struck by the baseball.

Other types of balls that are used by children include a resilient rubber outer shell which is filled with pressurized air. Such balls are bouncier than baseballs, but are easily damaged. Furthermore, once punctured, these balls must be repaired or discarded.

SUMMARY OF THE PRESENT INVENTION

The present invention provides a multiple purpose ball which is highly resistant to damage both by children and animals, but which is also lightweight in construction to protect children from damage if struck by the ball. The ball of the present invention can also be used as an animal toy.

In brief, the ball of the present invention comprises a spherical shell of polyurethane which forms a spherical interior. The spherical shell of polyurethane is constructed from a high density polyurethane and has a wall thickness sufficient to return the shell to its original shape following deformation. Preferably, the thickness of the shell is between one sixteenth and one quarter of an inch. The natural reaction of the material absorbs the compression energy and returns the ball to its original molded shape. This attribute makes it very safe for play with children or animals. The material also has excellent memory which acts to return the ball to its original shape when deformed.

Preferably the ball is substantially the same size as a baseball and includes ridges on its outer periphery which simulate the stitches on a conventional baseball. The ball is formed by injection/extrusion blow molding although other manufacturing processes can alternatively be used.

When used as an animal toy, the ball may include an aromatic flavoring which appeals to the animal. The high density polyurethane, however, is sufficiently tough to resist punctures even when chewed by the animal.

In a second embodiment of the invention, the interior of the ball is filled with a low density polyurethane foam. The filled ball has less "bounce" than the unfilled balls for applications which require less bounce. Such applications include, for example, roller blade street hockey.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
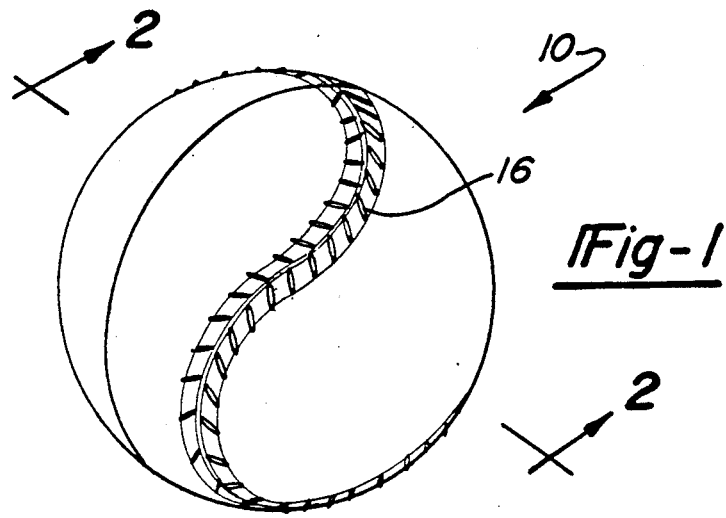
FIG. 1 is an elevational view illustrating a preferred embodiment of the present invention.
Figure 2:
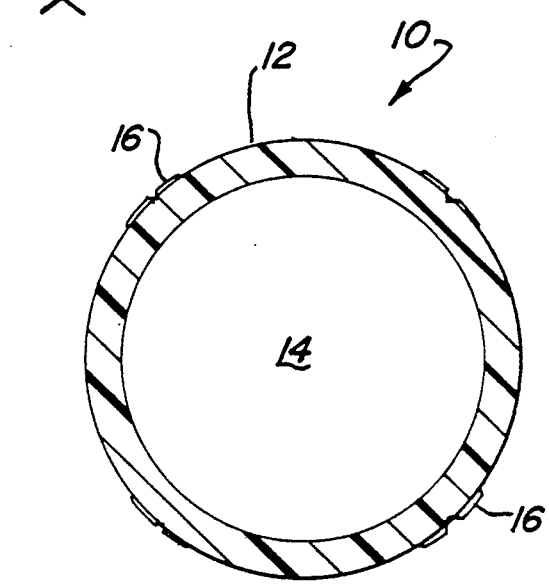
FIG. 2 is a sectional view taken substantially along line 2—2 in FIG. 1.

With reference first to FIGS. 1 and 2, a preferred embodiment of the ball 10 of the present invention is thereshown and comprises a spherical shell 12 defining a spherical interior 14. The shell 12 is constructed of a high density polyurethane which is highly resistant both to abrasion and puncture.

Referring now particularly to FIG. 2, the shell 12 preferably has a thickness of 1/16 to ¼ of an inch and it is found that this thickness is sufficient so that the shell returns to its original shape following deformation. Because of this, the ball 10 illustrated in FIGS. 1 and 2 has a high bounce and returns almost to its original height when dropped onto a solid surface.

The ball 10 is substantially the same size as a conventional baseball. Furthermore, as best shown in FIG. 1, the ball 10 has a plurality of outwardly protruding ridges 16 which simulate the stitching on a conventional rawhide baseball.

Preferably the ball 10 is manufactured by injection-/extrusion blow molding. Other types of manufacture, however, can alternatively be used.

The ball 10 is relatively lightweight in construction and thus can be safely used by children in baseball games or the like. The high resistance of the shell 12 to abrasion as well as penetration enables the ball to be used for extended periods of time without damage.

The ball 10 can also be used as an animal toy due to its resistance to cutting or penetration from chewing by the animal. Furthermore, the ball may be flavored with an aromatic compound which is pleasurable to an animal. Such animal flavorings are further disclosed in greater detail in my prior U.S. Pat. No. 4,513,014.

Figure 3:
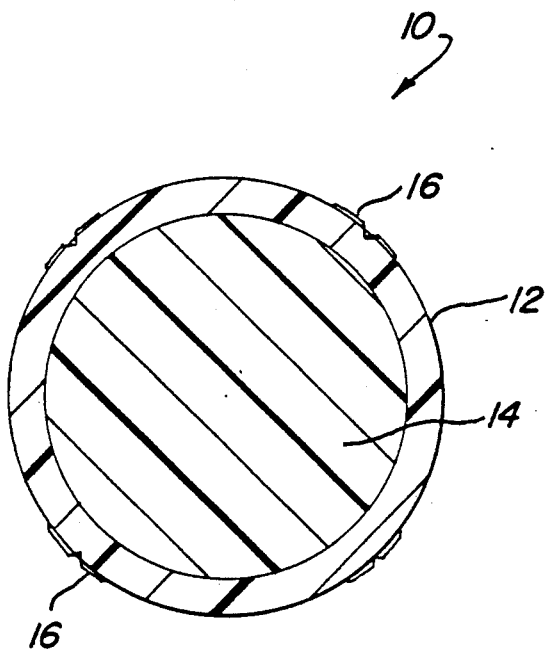
FIG. 3 is a sectional view similar to FIG. 2 but illustrating a second preferred embodiment of the present invention.

With reference now to FIG. 3 of the drawing, a second embodiment of the present invention is thereshown in which the interior 14 of the shell 12 is filled with a low density foam, such as low density polyurethane foam. The foam 14 deadens the ball 10 and thus reduces the bounce of the ball 10. Such a ball would be useful for applications where less bounce of the ball is desired, such as roller skate street hockey.

Although any conventional high strength high density polyurethane can be used to manufacture the shell 12, preferably, the polyurethane shell 12 has a hardness or durometer ranging between approximately 35 and 60 Shore D as measured by the ASTM (American Society of Testing Materials) test 2240; an ultimate tensil strength between approximately 20 and 25 MPa (mega pascals) measured by ASTM test D412; and ultimate elongation ranging between approximately 500 and 600; a tensil strength between approximately 6.9 and 16.5 MPa at 100% elongation; and between approximately 10.3 and 19 MPa at 300% elongation; a tensil strength of approximately 3% to 18% at 50% elongation; a tear strength of between approximately 80 and 140 kN/m (kilo Newtons per meter) measured by ASTM Test D 624-DieC; and a compression set of between approximately 30% and 40% at 70° C. over a 22 hour period.

Another advantage of the present invention is that the ball enjoys high abrasion resistance which prevents wear and tear on asphalt and concrete surfaces which normally destroy traditional balls. The ball is also waterproof and will also float for play in water and/or retrieving games.

From the foregoing, it can be seen that the present invention provides a unique ball which can be used in a number of different applications. Having described my invention, however, many modifications thereto will become apparent to those skilled in the art to which it pertains without deviation from the spirit of the invention as defined by the scope of the appended claims.

I claim:

1. A multiple purpose play ball comprising a spherical shell of polyurethane forming a hollow spherical interior, said shell having a wall thickness sufficient to return said shell to its original shape on impact with a solid surface and such that said ball rebounds almost to its original height when dropped onto a solid surface, said shell having a hardness ranging between approximately 35 and 60 Shore D as measured by the ASTM (Americal Society of Testing Materials) test 2240; an ultimate tensil strength between approximately 20 and 25 MPa (mega pascals) measured by ASTM test D412; an ultimate elongation ranging between approximately 500 and 600%; a tensil strength between approximately 6.9 and 16.5 MPa at 100% elongation; and between approximately 10.3 and 19 MPa at 300% elongation; a tensil strength of approximately 3% to 18% at 50% elongation; a tear strength of between approximately 80 and 140 kN/m (kilo Newtons per meter) measured by ASTM Test D 624-DieC; and a compression set of between approximately 30% and 40% at 70° C. over a 22 hour period.

2. The invention as defined in claim 1 wherein said polyurethane includes an aromatic flavor additive.

3. The invention as defined in claim 1 and including raised ridges on the exterior of said shell, said ridges simulating stitches of a conventional baseball.

4. The invention as defined in claim 3 wherein said shell has an outside diameter substantially the same as a conventional baseball.

5. The invention as defined in claim 1 wherein said wall thickness of said shell is between one sixteenth and one quarter of an inch.

* * * * *